Figure 1:
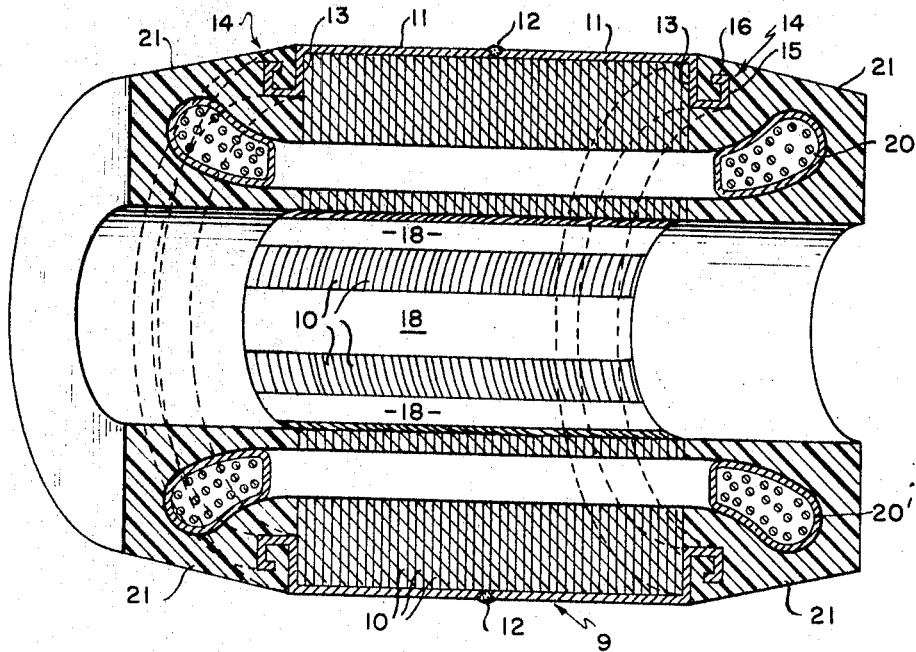

April 1, 1969   R. J. FLAHERTY, JR., ET AL   3,436,569
DYNAMOELECTRIC MACHINE STATOR ASSEMBLY WITH END TURN ENCAPSULATION
Filed Oct. 26, 1966

INVENTORS
ROBERT J. FLAHERTY, JR.
HENRY P. WALKER
BY JOHN A. KIMBALL, JR.

ATTY.

United States Patent Office 3,436,569
Patented Apr. 1, 1969

3,436,569
DYNAMOELECTRIC MACHINE STATOR ASSEMBLY WITH END TURN ENCAPSULATION
Robert J. Flaherty, Jr., 632 Binsted Road, Glen Burnie 21061, Henry P. Walker, 9412 Worth Ave., Silver Spring 20901, and John A. Kimball, Jr., Ferry Point Road, Rte. 3, Box 371, Annapolis, Md. 21403
Filed Oct. 26, 1966, Ser. No. 590,139
Int. Cl. H02k 1/04, 5/10
U.S. Cl. 310—43
6 Claims The invention described herein may be manufactured and used by or for the Government of the United States of America for governmental purposes without the payment of any royalties thereon or therefor.

This invention relates generally to improvements in dynamoelectric machines and the like, and more particularly to new and improved stator assembly and encapsulation.

In the field of moisture-proof dynamoelectric machines it has long been a problem to secure the laminated core structure together into a unitary mass and to encapsulate the laminated core and windings in such a way as to provide an adequate moisture barrier. Previous methods of securing the core laminations have included the use of rivets, or bolts through the individual laminations or weld seams along the edges of the laminations to form a solid stack. These methods provide leakage paths for eddy currents, leakage paths for moisture ingress, do not allow for unequal thermal expansion of the laminated stack and the windings, do not provide a place for attachment of encapsulating material, and of course are additional time-consuming operations. More recent improvements in this art have attended to the problem of retaining the laminations with bands or end caps secured end to end but do not provide for attachment of the encapsulating material.

The general purpose of this invention is to provide lamination securing means which overcome the aforesaid disadvantages of the prior art. To attain this, the present invention contemplates the use of uniquely formed flexible end caps which not only secure the laminations in a stack and eliminate the need for additional hardware but also provide a long moisture leakage path and a point of attachment for encapsulating compound.

Accordingly, an object of the present invention is to provide for the secure holding of laminations in an integral stack.

Another object is to provide a flexible securing means for a lamination stack.

A further object is to provide a long moisture leakage path to a lamination stack.

Still another object is to provide a flexible point of attachment for subsequent encapsulating compound.

Figure 2:
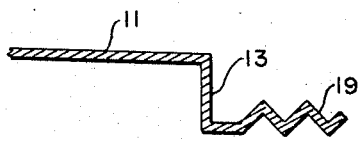

Other objects and features of the invention will become apparent to those skilled in the art as the disclosure is made in the following detailed description of the preferred embodiment of the invention as illustrated in the accompanying sheet of drawings in which:

FIG. 1 shows a orthographic projection partly in section, of a preferred embodiment of the invention; and FIG. 2 shows a section of another embodiment of the lamination and encapsulation securing device.

Referring now to the drawings, there is shown in FIG. 1 the stator winding assembly of a dynamoelectric machine. The stator core shown generally at 9 may be made from individually stamped out and insulated sheets or laminations 10 and stacked in registry as is well known in the art. The insulating material used on the individual laminations may be an appropriate plastic material, such as epoxy resin. The stator core is then formed into a unitary mass by the application of heat and pressure which presses the laminations together thereby causing the plastic material to bow and bond the laminations together at least temporarily.

The main import of this invention resides in the permanent securing of the laminations 10 into a unitary mass 9. End cups shown generally at 11 are formed from a thin, flexible nonmagnetic metal as shown in the preferred embodiment of FIG. 1. More specifically, end cups 11 are tubular, having an inside dimension equal to the outside dimension of the stator core laminations. These cups are open to the full dimension at one of the ends and partially closed at the other of the ends. Each of the partially closed ends is formed of an inwardly extending flange 13 providing a lamination securing portion, which is extended to form a short cylindrical section 14, the outer end of which is flared to form an outwardly projecting flange section 15, which may be terminated in another partial cylinder portion 16 projecting toward the first mentioned flange 13. The portion of the flange designated by 14, 15, 16, is called a channel section. The purpose of the configuration described is to be explained in more detail below.

As heretofore described, the end cups each has a tubular section having an inside dimension to provide a snug fit on the stack of laminations 10. The length of this tubular section between the weld 12 and the lamination securing portion of the flange 13 is equal to half the length of the lamination stack. This length of cups is such that when they are telescoped over opposite ends of the stator lamination stack and pressed together firmly, the laminations are held together and the seam may be welded around the circumference at 12. Once the flanges are firmly in contact with the ends of the lamination stack, and are welded together, the exterior edges of the laminations are effectively sealed from ingress of moisture.

The complex form extending from the flange 13 away from the cup section is multi-purpose. Flange elements 14, 15 and 16 comprise a channel section in FIG. 1 or corrugations 19 shown in FIG. 2, which may be referred to as the encapsulation securing portion, serve to strengthen flange 13, to extend the moisture leakage path through the plastic encapsulating material to the laminations, and to provide a flexible but secure point of attachment for the plastic encapsulating material. After the assembly of the stator laminations with the end cups, the windings 20, which may be wrapped with insulation 20', are placed in the slot cells 18. The entire stator core including the windings is placed in a mold and encapsulated with any suitable material, e.g., epoxy resins, in any well known manner. Upon curing, the encapsulating material assumes the shape shown as 21. It can now be seen that the unique configuration of the end cups, referred to as the encapsulation securing portion, provides an extended area of contact for attachment of the encapsulating material, and which by extending into the material tends to reduce the chances of moisture leakage into the stator laminations. It thus forms a secure but flexible attachment point for the encapsulating material used to enclose the end turns of the windings. Flexibility is required to allow for unequal thermal expansion of the copper windings, encapsulating material, and the iron stator laminations.

Obviously many modifications and variations of the present invention are possible in the light of the above teachings. It is therefore to be understood that within the scope of the appended claims the invention may be practiced otherwise than as specifically described.

What is claimed is:

1. A lamination securing device for a stack of laminations for a dynamoelectric machine, comprising:
   two end cups each having a tubular portion, the inside dimension of which is equal to the outside dimension of the stack, said tubular portion having a length one half the length of the stack, and being open at one end;

a flange at the other end of each tubular portion attached thereto extending inwardly perpendicular to said length of the stack to form a lamination securing portion; and an encapsulation securing portion of said end cup attached to an inner part of said flange and extending outwardly along and away from the length of said stack to engage plastic encapsulating material.

2. The device of claim 1, wherein the end cups are made of a flexible metal.

3. The device of claim 2 wherein the open ends of the tubular portions abut each other and are welded together all along the abutting seam.

4. The device of claim 2 wherein the metal is non-magnetic.

5. The device of claim 3 wherein the encapsulation securing portion of the flange is a channel section.

6. The device of claim 3 wherein the encapsulation securing portion of the flange is corrugated.

References Cited

UNITED STATES PATENTS

| | | | |
|---|---|---|---|
| 2,636,137 | 4/1953 | Andrus | 310—87 |
| 2,967,960 | 1/1961 | Waldschmidt | 310—86 |
| 3,075,250 | 1/1963 | Strohm et al. | 264—272 |
| 3,256,590 | 6/1966 | Myers | 310—43 X |

WARREN E. RAY, *Primary Examiner.*

U.S. Cl. X.R.

310—217, 260